(No Model.)
J. PICARD.
ANIMAL TRAP.
No. 451,839. Patented May 5, 1891.
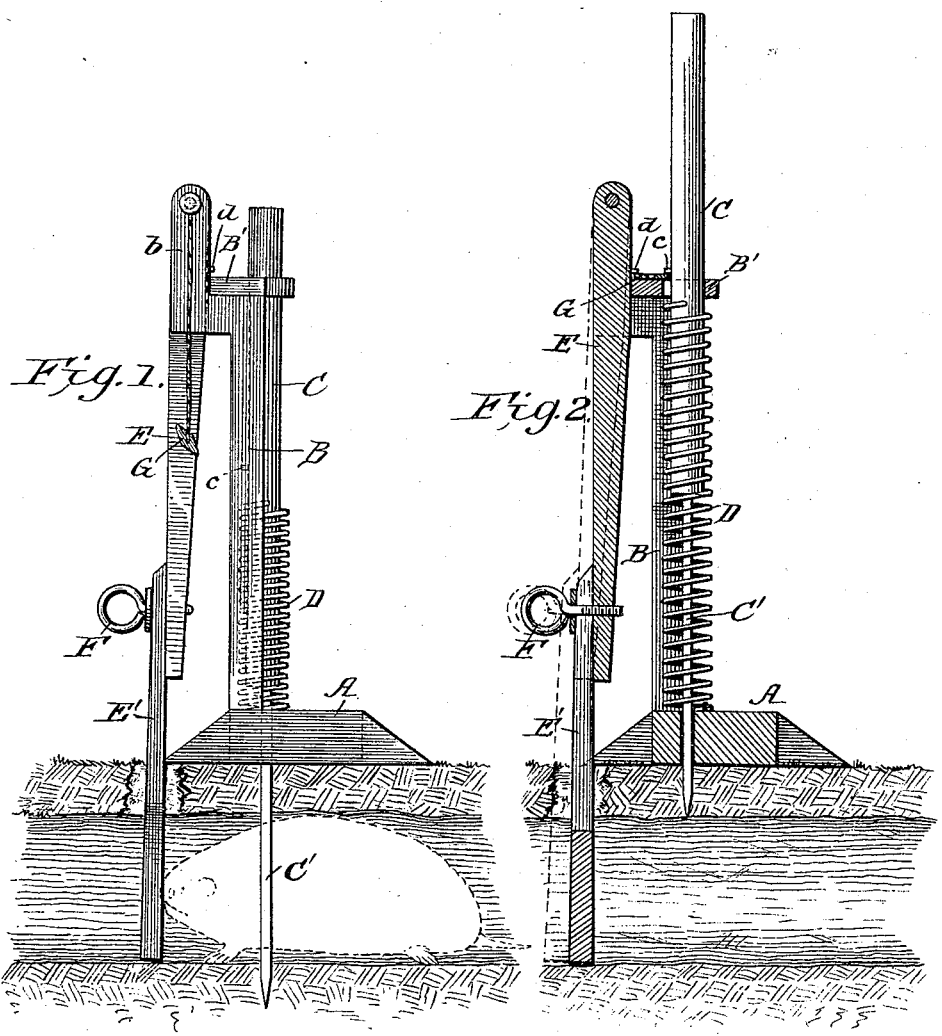
WITNESSES:
Fred J. Dieterich
Edw. W. Byrn
INVENTOR:
John Picard.
BY Munn & Co
ATTORNEYS

UNITED STATES PATENT OFFICE.

JOHN PICARD, OF ST. PAUL, OREGON.

ANIMAL-TRAP.

SPECIFICATION forming part of Letters Patent No. 451,839, dated May 5, 1891.

Application filed December 10, 1890. Serial No. 374,228. (No model.)

*To all whom it may concern:*

Be it known that I, JOHN PICARD, of St. Paul, in the county of Marion and State of Oregon, have invented a new and useful Improvement in Animal-Traps, of which the following is a specification.

My invention relates to that form of animal-trap for catching moles, gophers, &c., in which a vertical spear is forced down by a spring into the mole-passage to impale the animal, and which spear is held aloft by a trigger-arm, which is hinged or pivoted at its upper end and extends down to a position to be deflected by the passage of the animal, so as to release the spear and allow it to descend.

My invention consists in the peculiar construction and arrangement of said parts and their combination with a trip-plate for connecting the trigger to the spear-rod, and also in an adjustable trigger, as hereinafter more fully described.

Figure 1 is a side elevation with the spear down or the trap thrown, and Fig. 2 is a vertical section with the trap set.

In the drawings, A represents a base-frame that rests upon the ground. Upon this base are erected two vertical parallel standards B B, connected at the top by a cross-piece B'. Through this cross-piece there slides a vertical rod C, which at its lower end bears a spear C', that passes freely through a hole in the base. Surrounding this rod is a strong spiral spring D, whose upper end is attached to the rod and whose lower end is attached to the base, and the tension of which spring serves to pull the rod down and force the spear into the ground.

E is the trigger-arm. This is pivoted or hinged at its upper end to offsets $b$ from the standards which project up above the cross-piece B'. This arm extends down parallel with the standards B B, and at its lower end is provided with an extensible or adjustable section E'. This section is slotted and connected to the arm E by a clamp-screw F, so that the trigger-arm may be elongated or shortened, as may be desired. Upon the side of the spear-rod C is a short catch-pin $c$, and upon the side of the trigger-arm E, just above the cross-piece B', is another catch-pin $d$.

G is a trip-plate, which for convenience and to prevent it from becoming lost is connected to some part of the frame-work by a cord. This trip-plate serves to hold the trap to its set position by connecting the two catch-pins $c$ and $d$ in the following manner:

The trap is set with the base-piece crosswise the mole path or passage and with the spear immediately above the latter. The rod C is then raised with the spear until its pin $c$ is above the cross-piece B'. The trip-plate G is then placed upon the cross-piece B', with one end beneath the pin $c$ of the spear-rod and the other end beneath the pin $d$ of the trigger-arm. In this position it will be seen the plate G locks the spear-rod up against the tension of the spring until the pin $d$ of the trigger-arm is withdrawn from the top of the same. This the animal is made to do, and for that purpose the extensible end of the trigger-arm is placed directly across the path or passage-way of the mole, so that the latter when well under the spear will strike the trigger-arm, and by deflecting it will withdraw its pin $d$ from above plate G, allowing the latter to be tripped and the spear to descend and pierce the animal through the body.

I am aware that it is not broadly new in animal-traps to force the spear down by a spiral spring and to lock it up in elevated position by a vertical trigger which is pivoted at its upper end and engages directly with the spear—as shown, for instance, in Patent No. 374,135, dated November 29, 1887—and I make no claim to this arrangement.

Having thus described my invention, what I claim as new is—

1. The combination, with the base-frame A, having vertical standards rising therefrom and connected at the top by a cross-bar B', of the spear-rod C, with projection or pin $c$, guided through the cross-bar B', and having at its lower end a spear C', guided through the base, the spiral spring D, surrounding said rod and connected to it at its upper end and bearing at its lower end against the base, the trigger-arm E, hinged at its upper end to the stationary frame-work and bearing upon its side a pin or projection $d$, and the disconnected trip-plate G, arranged to be seated upon the top of cross-bar B' beneath the pins or projections c and d to hold the spear-rod aloft till tripped by the movement of the trigger-arm, substantially as shown and described.

2. The combination, in an animal-trap, as described, of a spear-rod having pin or projection c, a frame having a cross-bar B', with an elevated offset b, a trigger-arm E, pivoted or hinged at its top to the top of the offset and having pin or projection d on its side, and the disconnected trip-plate G, adapted to be seated upon the cross bar B' beneath the pins or projections c and d, substantially as shown and described.

3. The combination, in an animal-trap, of a descending spear, locking device for holding it up, and a trigger-arm E, hinged at its upper end for a lateral tripping movement at its lower end and having at its lower end an adjustable or extensible section E', substantially as shown and described.

JOHN PICARD.

Witnesses:
JOHN F. T. B. BRENTANO,
KATE BRENTANO.